United States Patent
Shahid

(10) Patent No.: US 6,356,687 B1
(45) Date of Patent: Mar. 12, 2002

(54) OPTOELECTRONIC MODULES FOR OFFSET LAUNCHING OF OPTICAL SIGNALS, AND METHODS FOR MAKING SAME

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/285,633

(22) Filed: Apr. 2, 1999

(51) Int. Cl.[7] .............................. G02B 6/30; G02B 6/26; G02B 6/36
(52) U.S. Cl. .............................. 385/49; 385/50; 385/51; 385/88
(58) Field of Search .............................. 385/28, 29, 49, 385/50, 51, 52, 88, 90

(56) References Cited

U.S. PATENT DOCUMENTS

| | | | |
|---|---|---|---|
| 4,775,401 A | | 10/1988 | Fleming et al. |
| 4,915,468 A | * | 4/1990 | Kim et al. .................... 385/28 |
| 5,287,426 A | | 2/1994 | Shahid |
| 5,388,174 A | | 2/1995 | Roll et al. |
| 5,530,709 A | * | 6/1996 | Waarts et al. .................... 372/6 |
| 5,603,870 A | | 2/1997 | Roll et al. |
| 5,621,834 A | | 4/1997 | Anderson et al. |
| 5,632,908 A | | 5/1997 | Shahid |
| 5,639,387 A | | 6/1997 | Shahid |
| 5,857,049 A | | 1/1999 | Beranek et al. |
| 6,064,786 A | * | 5/2000 | Cunningham et al. ........ 385/38 |

* cited by examiner

*Primary Examiner*—Jon Henry

(57) ABSTRACT

An optoelectronic module that can be coupled to a multi-mode optical fiber to achieve offset launch of optical signals into a multimode optical fiber without the use of specialized components or equipment is disclosed. An optoelectronic module in accordance with the present invention achieves this by offsetting the center of the core of the optical fiber pigtail that is coupled to the optoelectronic transmitter device. Thus, the optical fiber pigtail comprises a predetermined offset of the center of the core with respect to the center of the optical fiber. Such an offset can be readily manufactured in an optical fiber using rod-in-tube technology. The precise offset can be designed to correspond to the offset launch zone of the multimode optical fiber to which the optoelectronic module may be coupled. Accordingly, an optoelectronic module in accordance with an embodiment of the present invention may increase the available bandwidth of a multimode optical fiber coupled to the optoelectronic module via the offset launch condition.

8 Claims, 4 Drawing Sheets

OPTOELECTRONIC MODULES FOR OFFSET LAUNCHING OF OPTICAL SIGNALS, AND METHODS FOR MAKING SAME

FIELD OF THE INVENTION

The present invention generally relates to optoelectronic modules and, more particularly, to improved optoelectronic modules that can be efficiently and advantageously coupled to multimode optical fibers.

BACKGROUND OF THE INVENTION

Fiber optic technology is playing an ever-increasing roll in the modern age of communications. As communication standards such as Fiber Channel (1062 Mbps) and Gigabit Ethernet (1000 Mbps) place ever-increasing demands on the physical layer infrastructure, optical fiber is being looked to more and more as the transmission medium of choice. Advancements in optoelectronic devices have furthered the desirability of optical fiber because optical fiber systems not only support the high data transmission rates, but the cost is becoming more and more affordable.

A key aspect to the affordability is the modularity by which the advancements in optical fiber technology are being implemented, particularly with regard to their backward compatibility with existing network components. Advancements that cannot be delivered to the marketplace with backward compatibility may not be as desirable as competing advancements which are backward compatible. For example, if an advancement requires recabling an entire building, then it may not be a viable solution. If an advancement requires specialized equipment, specialized connectors, specialized patch cords, etc., then it too may not be a viable solution. Accordingly, a desirable feature of any new technological advancement is the modularity and/or compatibility with existing components.

As an instance, it has been shown that the bandwidth of a multimode optical fiber can be increased by launching optical signals from a single-mode optical fiber into the multimode optical fiber with a deliberate, predetermined offset between the central axis of the single-mode optical fiber and the central axis of the multimode optical fiber. This feature, referred to as off-axis or offset launch condition, represents a significant advancement because it has the potential to extend the bandwidth of multimode optical fiber already installed in existing network configurations, such as in a local area network (LAN). By increasing the available bandwidth, the useful life of existing or new installations of multimode fiber may be lengthened.

However, because the dimensions of the offset for an offset launch condition are so small, typically less than 30 micrometers, the launching single-mode fiber and the receiving multimode optical fiber need to be precisely aligned, preferably within 4–8 micrometers ($\mu$m). Two suggested methods for achieving this precise offset include the use of a specialized patch cord that incorporates a desired level of offset or an adapter that precisely aligns the optical fiber so that their cores have a predetermined offset, as described in the co-pending patent application Ser. Nos. 09/210,923 and 09/211,117, both of which are assigned to the assignee of the present application. While these techniques have some merit, they generally require one or more specialized components or pieces of equipment for effectuating an offset launch condition at the fiber interface.

Thus, there continues to exist an unsatisfied need in the industry for an optoelectronic module that can be coupled to a multimode optical fiber under an offset launch condition without utilizing specialized equipment or components.

SUMMARY OF THE INVENTION

The present invention is an optoelectronic module that can be coupled to a multimode optical fiber so as to achieve an offset launch condition without the use of specialized components or equipment. An optoelectronic module in accordance with the present invention achieves this by utilizing a single-mode optical fiber pigtail with an offset core. That is, the single-mode optical fiber pigtail includes a predetermined offset of the center of the core with respect to the center of the optical fiber. Such an offset can be readily manufactured in an optical fiber using rod-in-tube technology, or in a planar waveguide using standard photolithographic techniques. The precise offset can be designed to correspond to the offset launch zone of a multimode optical fiber to which the optoelectronic module is to be coupled. Accordingly, the available bandwidth of the multimode optical fiber may be increased.

In accordance with an aspect of the present invention, an optoelectronic module comprises an optoelectronic device, a single-mode optical conductor aligned with the optoelectronic device for receiving optical signals therefrom, wherein the single-mode optical conductor further includes a core surrounded by cladding. The center of the core is radially offset from the center of the cladding by a predetermined distance. The predetermined distance of the radial offset is sufficient to provide an offset launch condition when the optical conductor is coupled to a multimode optical fiber. The single-mode optical conductor may be an optical fiber or a planar optical waveguide. Further, the optoelectronic module may be a light transmitting device.

In the case where the single-mode optical conductor is an optical fiber, the center of the core may be offset from the center of the cladding by approximately 17–23 $\mu$m for the single-mode optical fiber which is to be coupled with a multimode fiber having a core radius of approximately 31.25 $\mu$m. Alternatively, where the core radius is approximately 25 $\mu$m, the center of the core of the single-mode fiber is offset from the center of the cladding by approximately 10–16 $\mu$m.

Further, the optoelectronic module may comprise a first multimode optical fiber coupled to the single-mode optical conductor, wherein the multimode optical fiber includes a core and a cladding surrounding the core. The center of the cladding of the first multimode optical fiber and the center of the cladding of the single-mode optical conductor are substantially coaxial, though the off-center core of the single-mode optical conductor provides for an offset launch condition into the multimode optical fiber.

In accordance with another aspect of the present invention, a method for fabricating an optoelectronic module comprises providing an optoelectronic transmitter device, providing a single-mode conductor having a first end, a second end, and a core surrounded by a cladding, and coupling the first end of a single mode optical conductor to the optoelectronic module so that the optical conductor receives optical signals from the optoelectronic module. The single-mode optical conductor is characterized by having the center of the core radially offset from the center of the cladding by a predetermined distance that is sufficient to provide an offset launch condition into a suitable multimode fiber which may be coupled to the second end of the single-mode optical conductor. The method further comprises the step of coupling such a multimode fiber to the second end of the single-mode optical conductor, wherein the predetermined offset produces the offset launch condition of optical signals transmitted from the single-mode optical fiber into the multimode optical fiber.

The step of providing the optical conductor may include the step of fabricating the optical conductor by inserting a silica-based core rod into a silica-based porous tube to form a fiber preform with a predetermined offset between the axial center of the core and the axial of the center of the porous tube. The single-mode optical conductor drawn from the preform will have the geometries of the fiber preform, including the predetermined offset, as well known in the art.

In accordance with another aspect of the present invention, a single-mode optical conductor, such as an optical fiber or waveguide, comprises a single-mode core region having a first central axis and a cladding region surrounding the core region and having a second central axis, wherein the first central axis is radially offset from the second central axis by a predetermined distance that is sufficient to provide an offset launch condition in a concentrically aligned and mating multimode optical conductor. The distance of the offset may be between 10–23 micrometers, depending on numerous factors, including but not limited to the radius of the core of the mating optical conductor and the bandwidth/distance requirement.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrating the principles of the present invention. Furthermore, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is applicable to a wide variety of optoelectronic modules wherein an optoelectronic device (such as a semiconductor lasers LED, photodiode or a waveguide) is coupled to one or more optical fibers. It is understood that the invention is not to be limited to a particular type of optoelectronic device. It may be utilized, for instance, to allow for coupling of a laser (such as an edge-emitted laser or vertical cavity surface emitting laser (VCSEL)) to a multimode optical fiber or fiber array via respective single-mode optical fiber pigtails coupled to an array of optoelectronic devices.

Figure 1:
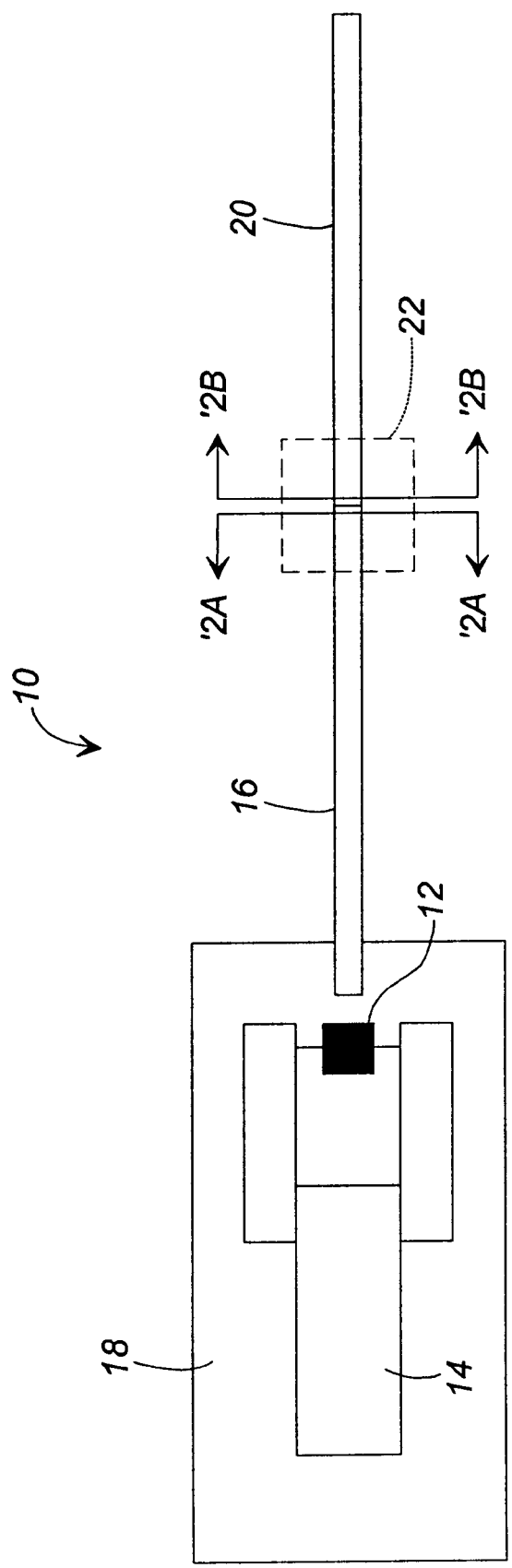
FIG. 1 is a schematic diagram of an optoelectronic module in accordance with an embodiment of the present invention, wherein a multimode optical fiber is coupled to the single-mode optical fiber pigtail of the optoelectronic module.

FIG. 1 illustrates a simplified schematic of an embodiment of an optoelectronic module 10 in accordance with the present invention. The optoelectronic module 10 comprises an optoelectronic device 12, such as a transmitter module, that is controlled by control circuitry 14. However, it is noted that control circuitry 14 is not required for the optoelectronic module 10, but alternatively, the control circuitry 14 may be provided separate from the optoelectronic module 10. The optoelectronic module 10 also comprises a single-mode optical fiber pigtail 16 aligned with the optoelectronic device 12 for receiving optical signals therefrom. The single-mode optical fiber 16 may be permanently attached to the optoelectronic device 12 after optimizing its coupled power, or may be detachably connected to the optoelectronic's optical interface for maximized coupled optical power. In accordance with an important feature of the present invention, the optical fiber pigtail 16 comprises a central light-carrying region (hereafter referred to as the core) that is substantially off-center. In particular, the core is offset by a predetermined distance from the central axis of the optical fiber. Accordingly, the optoelectronic module 10 can be advantageously interconnected with a multimode optical fiber so as to create an offset launch condition to increase the available bandwidth within the multimode optical fiber, as discussed in greater detail below, without the use of specialized equipment or components.

The optical fiber pigtail 16 is aligned and fixed (permanently or detachably) to the optoelectronic device 12 via, for example, a support member 18 such as a planar substrate. While the present invention is not to be limited to any one method for aligning the optical fiber 16 with the optoelectronic device 12 or one method of fixing an end of the optical fiber pigtail 16 to the support member 18, preferred methods for doing so are disclosed in U.S. Pat. No. 5,857,049, issued to Beranek et al., the disclosure of which is incorporated herein by reference as if set forth in full. Though it is not contemplated in the disclosure of U.S. Pat. No. 5,857,049 to couple an optical fiber having an off-center core to an optoelectronic device, the teachings of U.S. Pat. No. 5,857,049 can be readily applied to the present invention wherein an optical fiber pigtail 16 having an off-center core is coupled to an optoelectronic device 12. In particular, the alignment of optical fiber pigtail 16 with respect to opto-electronic device 12 is a function of determining their relative position so as to maximize the light detected through the optical fiber pigtail 16, which determination is not affected by the eccentricity of the core of the optical fiber pigtail 16. If the optical fiber pigtail 16 is detachably connected to the optoelectronic device 12 by an optical interface and coupling scheme, then the optical interface and coupling scheme should be designed to accommodate the off-center core of the optical fiber pigtail 16 so a maximum optical power/signal is coupled to and transmitted through the optical fiber 16.

A multimode optical fiber 20 may be coupled to the optoelectronic module 10 by an optical connector 22. The multimode optical fiber 20 may be transmission fiber that interfaces the optoelectronic module 10 with an optical communications system (not shown), as well known in the industry. For instance, multimode optical fiber 20 may be an existing optical fiber cable installed in an office building. The optical connector 22 may be any commercially available connector suited for coupling a single mode optical fiber 16 to a multimode optical fiber 20, such as the ST, SC, FC or LC connectors, all of which are available from Lucent Technologies, Inc. Advantageously, the optoelectronic module 10 does not require the utilization of a specialized or customized optical connector 22 in order to achieve an offset launch condition into multimode optical fiber 22. Thus, an optoelectronic module in accordance with the present invention can be relatively easily installed because it does not require specific or specialized equipment or components.

Figure 2A:
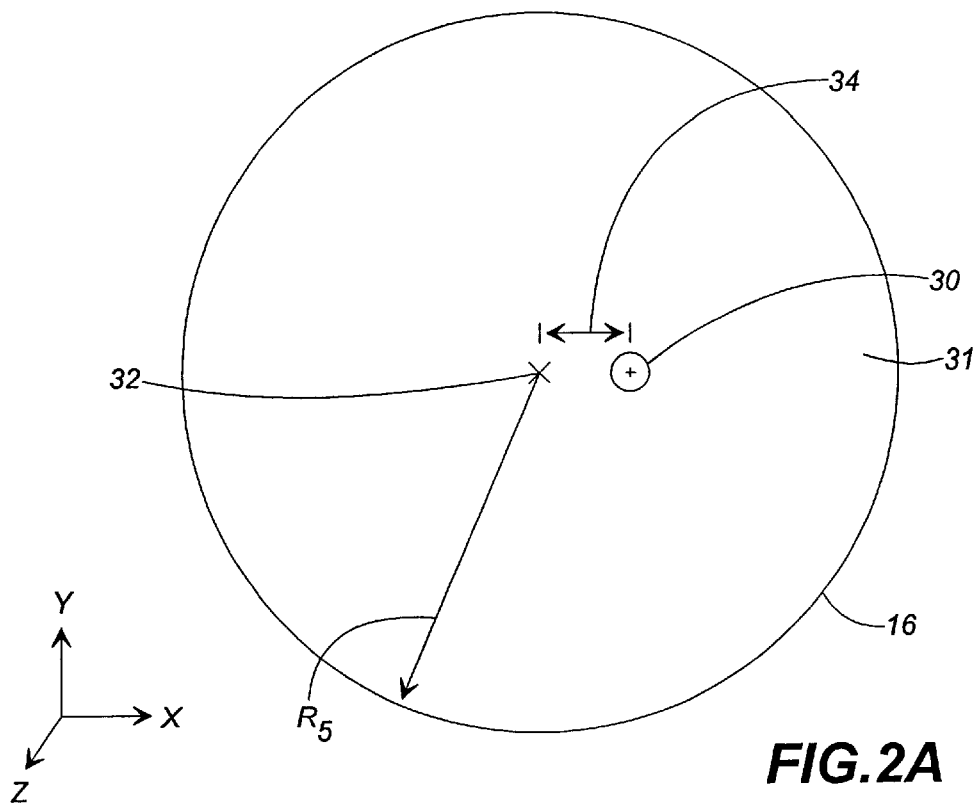
FIG. 2A illustrates an end view of the single-mode optical fiber pigtail of the optoelectronic module taken along lines '2A—'2A of FIG. 1.

With reference to FIG. 2A, the optical fiber pigtail 16 includes an optical core 30 that is radially offset from the central axis 32 of the optical fiber pigtail 16 by a predetermined distance 34. The optical core 30 is surrounded by a cladding 31, as well known in the industry. However, where conventional wisdom is to make the optical core 30 and central axis 32 concentric, the present invention deliberately incorporates a predetermined eccentricity, that is, a predetermined radial offset from the central axis 32. The precise distance 34 of the offset is determined so that optical signals are launched into the higher order modes of the receiving multimode optical fiber 20 when coupled to the single-mode optical fiber pigtail 16. While the direction of the radial offset is shown in the X direction for purposes of illustrating the present embodiment, it is known that the offset may be in the X or Y direction, or any combination thereof.

Figure 2B:
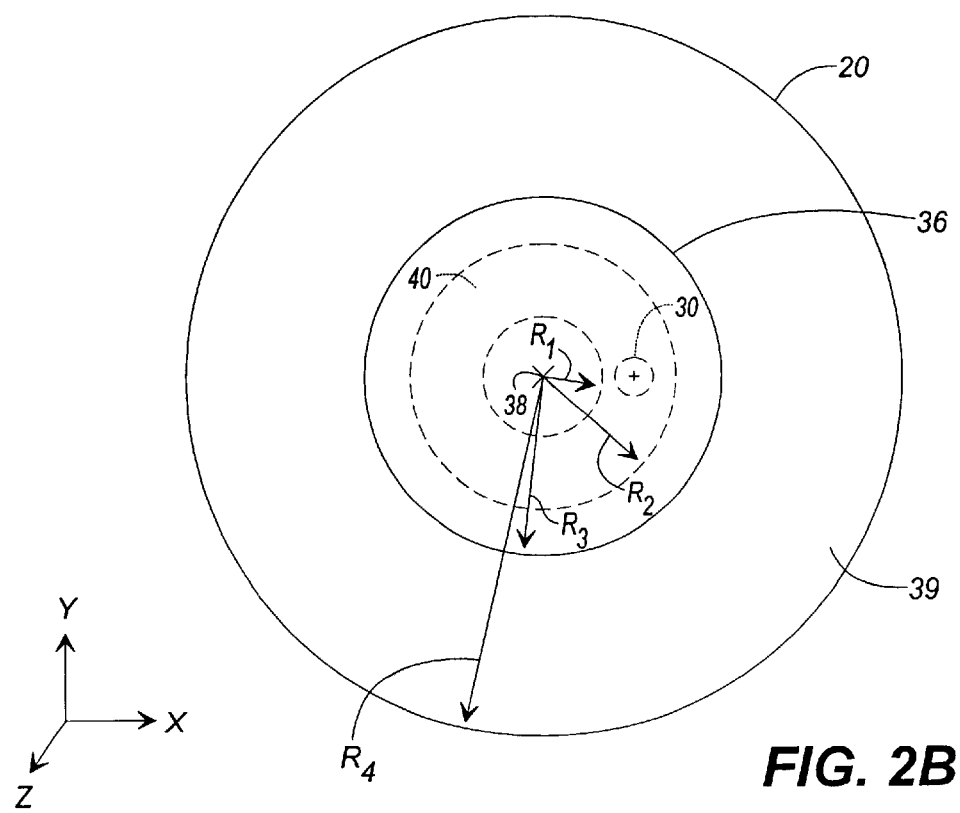
FIG. 2B illustrates an end view of the multimode optical fiber taken along lines '2B—'2B of FIG. 1.

With reference to FIG. 2B, the multimode optical fiber 20 includes an optical core 36 which is concentric with the central axis 38 of the optical fiber 20. The optical core 36 is surrounded by cladding 39. The optical core 36 includes an annular offset launch zone 40 defined by radius $R_1$ and radius $R_2$. It has been recognized that the link performance in bandwidth, skew/jitter, and loss of the multimode optical fiber 20 may be improved if optical signals are launched so as to partially fill the optical modes in the multimode optical fiber 20. Of particular interest is the enhancement to the available bandwidth in the multimode optical fiber 20 which may operate to increase the distance and amount of data which may be transmitted.

One method of achieving this enhanced performance of a multimode optical fiber is by launching optical signals from a single-mode optical fiber into the receiving multimode optical fiber, wherein the centers of the respective cores of the optical fibers are somewhat misaligned. This substantially avoids the core center and the core-cladding boundary regions where relatively large density of scattering centers (i.e., irregularities and impurities which cause scattering residue) reside. These irregularities and impurities are known to cause undesirable scattering, which essentially comprises the re-radiation of optical signals that results in new modes being excited that were not excited before the discontinuity was encountered. As more and more modes are excited, interference with one another cause degradation in the signal propagating through the optical fiber. A consequence for this condition is that the differential mode delay (DMD) of a group of neighboring excited modes is small compared to those of all the modes if excited. However, a misalignment, or offset, launch condition naturally underfills the multimode optical fiber and excites only annular modes that then propagate without appreciable degradation, thereby achieving the enhanced performance discussed above.

The determination of the radii $R_1$, and $R_2$ which define the offset launch zone 40 is based upon various factors such as, but not limited to, the dimensions of the optical core, the operational bandwidth desired of the multimode optical fiber, and the allowable coupled power ratio (CPR). Accordingly, the radii $R_1$ $_{and}$ $_{R2}$ can be empirically determined, as illustrated by Examples 1 and 2 provided in Table 1 below.

TABLE 1

| | Offset Launch Zone Lower Limit ($R_1$) | Offset Launch Zone Upper Limit ($R_2$) | Core Radius ($R_3$) | Clad Radius ($R_4$) |
| --- | --- | --- | --- | --- |
| Example 1 | 6 μm | 20 μm | 25 μm | 50 μm |
| Example 2 | 13 μm | 27 μm | 31.25 μm | 62.5 μm |

In Example 1, radii $R_1$ and $R_2$ are determined for a single-mode offset launch into a multimode optical fiber having a core radius $R_3$ of 25 μm. For purposes of this example, the operational parameters are as follows: link bandwidth of 500 MHz-km, single-mode operational wavelengths near 1300 nanometer (nm) (per ISO/IEC 11801), and a CPR range of between −12 dB to −20 dB. As indicated in Table 1, the offset launch zone 40 of Example 1 is defined by an inner radius $R_1$ of 6 μm and an outer radius $R_2$ of 20 μm. It should be noted, however, that typical single-mode optical fibers have an outer radius of approximately 4–4.5 μm and, therefore, the offset distance 34 in Example 1 should be approximately 10–16 μm.

In Example 2, the clad radius R4 is 62.5 μm and the core radius $R_3$ is 31.25 μm. In addition, the same operational parameters set forth in Example 1 are applied in this example with exception that the CPR is between −28 dB to −40 dB. As indicated in Table 1, the offset launch zone 40 of Example 2 is defined by an inner radius $R_1$ of 13 μm and an outer radius $R_2$ of 27 μm. Therefore, the offset distance 34 should be between approximately 17 and 23 μm for a single-mode optical fiber having a core radius of between 4–5.0 μm. Thus, for a given offset launch zone 40 defined by the dimensional and desired operational characteristics of a multimode optical fiber 20, the offset distance 34 of optical core 30 can be determined. The present invention may then utilize the optimized offset core distance determined above to provide optical fiber pigtail with such a core offset so as to achieve the enhanced performance in a multimode optical fiber coupled thereto.

Figure 3:
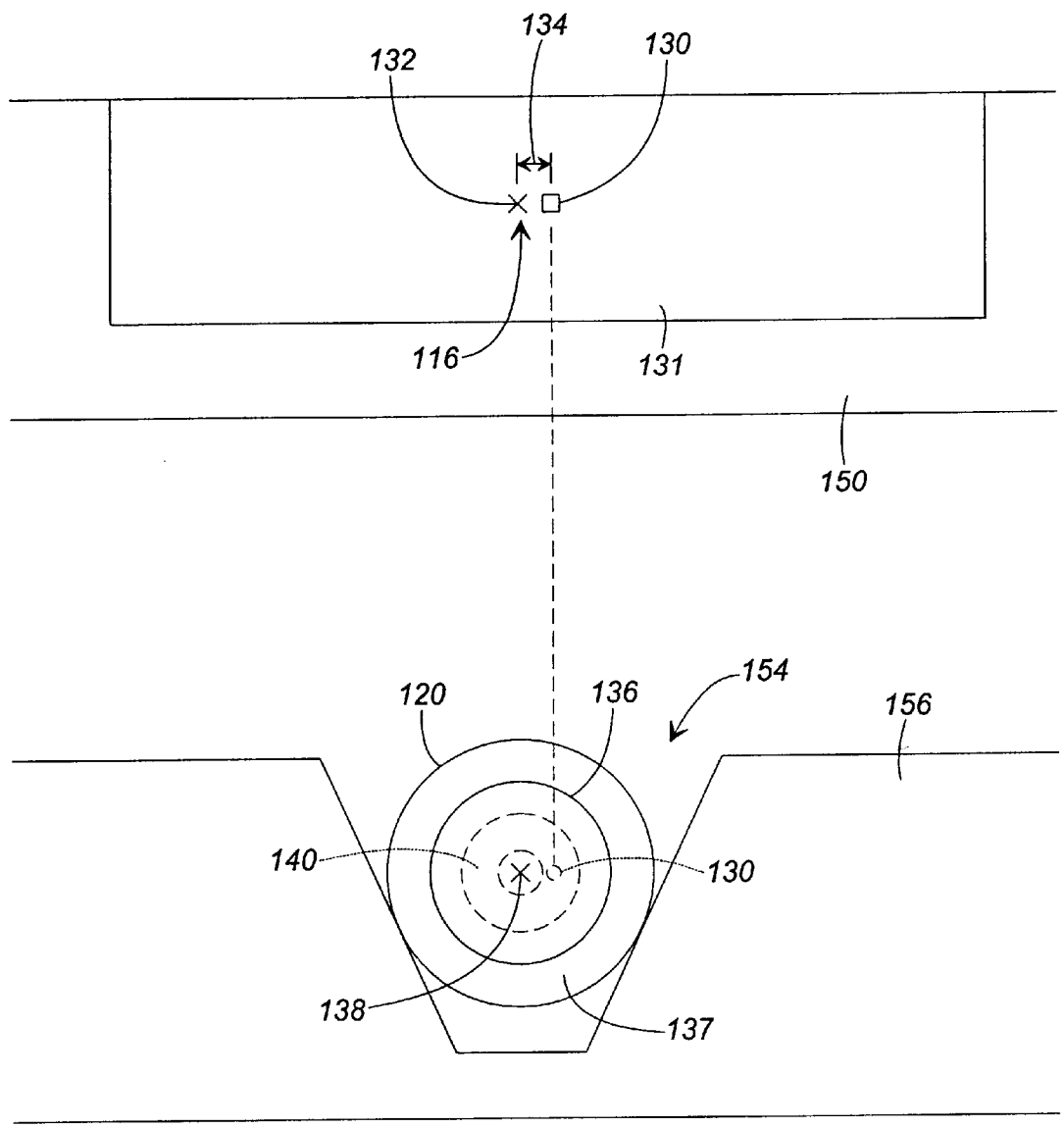
FIG. 3 illustrates end views of a single-mode planar waveguide pigtail of an optoelectronic module in accordance with the present invention, and a multimode optical fiber that is to be coupled to the planar waveguide pigtail, wherein the alignment of the pigtail and the multimode fiber is shown.

With reference now to FIG. 3, an alternative embodiment of the present invention is illustrated, wherein the optoelectronic module includes a silica-based waveguide 116 integrally fabricated with a substrate 150. Though not illustrated, the optoelectronic module may comprise an optoelectronic device that advantageously may be integrally formed with substrate 150, as will be appreciated by one of ordinary skill in the art. The waveguide 116 comprises an optical core 130 surrounded by a cladding 131. While the cladding 131 is illustrated in FIG. 3 with a substantially rectangular cross section, it is recognized that the cladding 131 may take numerous cross sectional forms, such as planar or square. The waveguide 116 includes a central axis 132 from which the core 130 is offset by distance 134. As discussed above with regard to the preferred embodiment, the offset distance 134 can be predetermined based upon numerous factors such as the core dimensions of the waveguide 116 and the multimode optical fiber 120, and the desired operational characteristics for the multimode optical fiber 120 to which the waveguide 116 is coupled.

The multimode optical fiber 120 is shown, for illustrative purposes, within a V-groove 154 which precisely aligns the central axis 138 of the multimode optical fiber 120 with the central axis 132 of the waveguide 116, as well known in the art. The V-groove 154 may be defined by substrate 156. The multimode optical fiber 120 includes an optical core 136 having an offset launch zone 140. For purposes of this embodiment, the offset launch zone 140 can be determined empirically in substantially the same manner as described above with regard to the preferred embodiment. Accordingly, given the offset launch zone 140 of multimode optical fiber 120, the offset distance 134 of the waveguide pigtail 116 can be precisely determined so that optical signals launched from the optical core 130 are received within the offset launch zone 140 to excite only part of annular modes thereof so as to achieve the advantageous performance of an offset launch condition, including the enhanced bandwidth of the multimode optical fiber 120.

Figure 4:
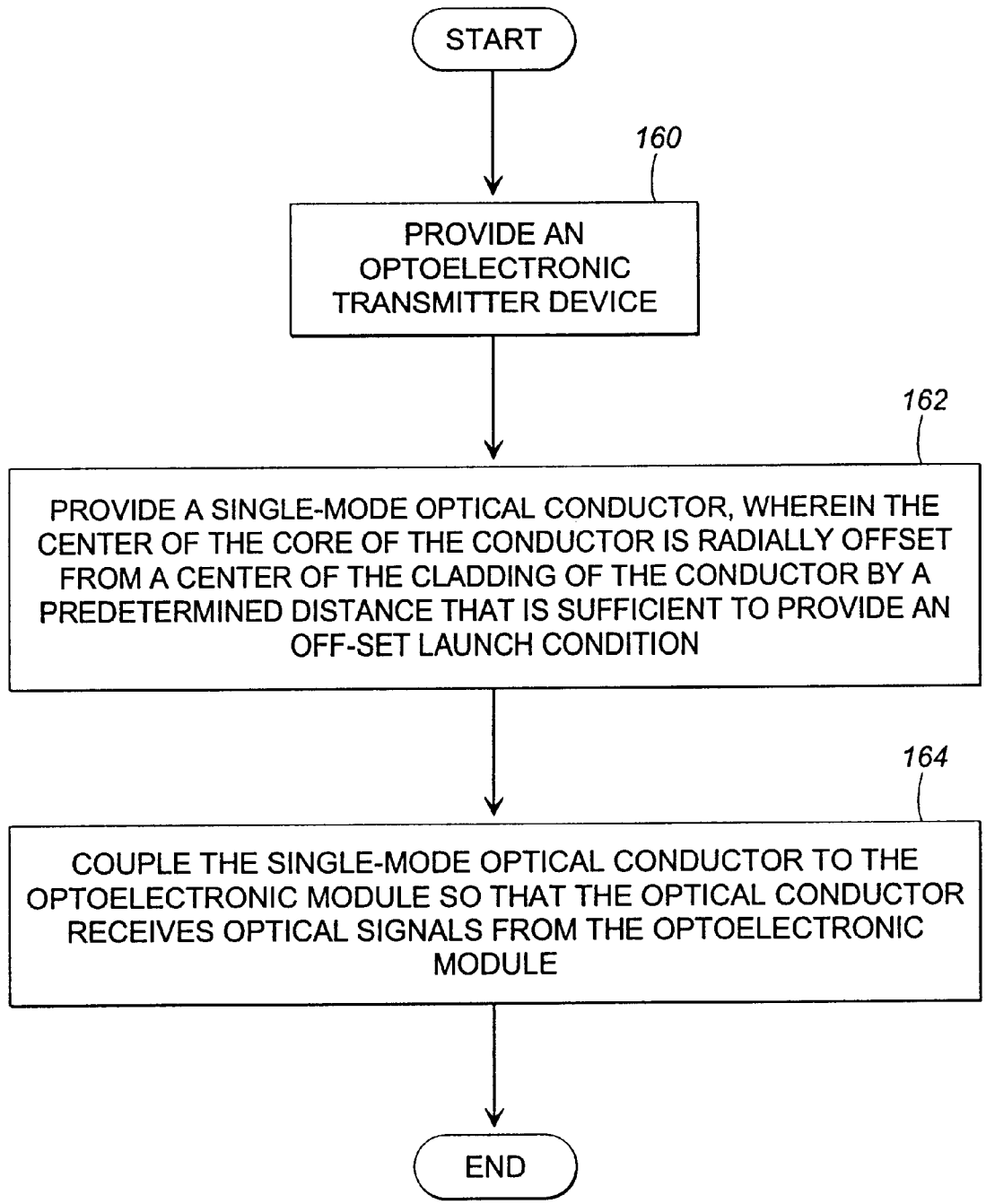
FIG. 4 is a flowchart of the fabrication of an optoelectronic module in accordance with an embodiment of the present invention.

With reference to FIG. 4, a method for fabricating an optoelectronic module in accordance with the present invention is provided. Initially, an optoelectronic transmitting device is provided, as indicated by block 160. The optoelectronic transmitting device may be any suitable active optical device capable of imparting an optical signal into a light carrying device, such as a semiconductor laser, an LED, a photodiode, a surface emitting laser, etc., all of which are commercially available. Next, at block 162, a single-mode optical conductor is provided. The optical conductor, such as an optical fiber or a planar optical waveguide, is characterized by having its core radially offset from the center of the optical conductor by predetermined distance that is sufficient to provide an offset launch condition.

In the case where the single-mode optical conductor is an optical fiber, the offset of the core can be readily fabricated utilizing rod-in-tube technology where the tube has a suitably offset cylindrical opening. Specifically, a silica-based porous jacketing tube (i.e., the cladding) with a cylindrical opening or cavity that is offset from the central axis of the tube by a predetermined distance receives a silica-based glass rod (i e., the core) so as to form an optical fiber preform. Optical fiber may then be drawn from the preform in a conventional manner. As known in the industry by those of ordinary skill in art, the geometries of the preform, including the offset core, are identically replicated in the fiber drawn from the preform. A more detailed discussion of rod-in-tube technology may be found in at least U.S. Pat. No. 4,775,401, issued to Fleming et al., the disclosure of which is incorporated herein by reference as if set forth in full.

In the case of a planar optical waveguide, the core may be offset using standard photolithographic techniques well known in the industry for fabricating planar optical waveguides. Specifically, precisely defined masking layers which define the position of the optical core can fabricate with a precise offset the core. Thus, the optical core will be axially offset from the central axis of the multimode optical fiber to which it is coupled. Accordingly, if the multimode optical fiber is placed within a V-groove for alignment with a waveguide pigtail, then the optical core will be offset with respect to the V-groove.

Lastly, at block 164, the single mode optical conductor is coupled to the optoelectronic module so that the optical conductor receives optical signals from the optoelectronic module. Accordingly, the optical optoelectronic module advantageously may then be coupled to a multimode optical fiber so as to provide an offset launch condition into the multimode optical fiber with the use of standard commercially available optical connectors.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optoelectronic module, comprising:
   an optoelectronic device; and
   a single-mode optical conductor including a first end and a second end, the first end being aligned with the optoelectronic device to receive optical signals therefrom, the single-mode optical conductor further including a core surrounded by a cladding, wherein the center of the core is radially offset from a center of the cladding by a predetermined distance;

whereby the predetermined distance of the radial offset is sufficient to provide an offset launch condition when the second end of the single-mode optical conductor is coupled to a multimode optical fiber; and a first multimode optical fiber coupled to the second end of the single-mode optical conductor, wherein the first multimode optical fiber includes a core and a cladding surrounding the core, wherein the center of the cladding of the first multimode optical fiber and the center of the cladding of the single-mode optical conductor are substantially co-axial; wherein the core of the multimode optical fiber has a radius of approximately 31.25 micrometers and the center of the core is offset from the center of the cladding by approximately 17 to 23 micrometers.

2. The optoelectric module of claim 1, wherein said single-mode optical conductor is a planar optical waveguide.

3. The optoelectronic module of claim 1, wherein the optoelectronic device comprises an optical transmitter.

4. The optoelectronic module of claim 1, wherein the said single-mode optical conductor is an optical fiber.

5. An optoelectronic module, comprising:

an optoelectronic device; and a single-mode optical conductor including a first end and a second end, the first end being aligned with the optoelectronic device to receive optical signals therefrom, the single-mode optical conductor further including a core surrounded by a cladding, wherein the center of the core is radially offset from a center of the cladding by a predetermined distance;

whereby the predetermined distance of the radial offset is sufficient to provide an offset launch condition when the second end of the single-mode optical conductor is coupled to a multimode optical fiber; and further comprising a first multimode optical fiber coupled to the second end of the single-mode optical conductor, wherein the first multimode optical fiber includes a core and a cladding surrounding the core, wherein the center of the cladding of the first multimode optical fiber and the center of the cladding of the single-mode optical conductor are substantially co-axial;

wherein the core of the multimode optical fiber has a radius of approximately 25 micrometers and the center of the core is offset from the center of the cladding by approximately 10 to 16 micrometers.

6. The optoelectronic module of claim 5, wherein said single-mode optical conductor is an optical fiber.

7. The optoelectronic module of claim 5, wherein said single-mode optical conductor is a planar optical waveguide.

8. The optoelectronic module of claim 5, wherein the optoelectronic device comprises an optical transmitter.

* * * * *